Dec. 31, 1940. E. N. JACOBI Re. 21,679

FLYWHEEL MAGNETO ASSEMBLY FOR INTERNAL COMBUSTION ENGINES

Original Filed Sept. 16, 1936 2 Sheets-Sheet 1

Inventor
Edward N. Jacobi
By Dwight Jones
Attorney

Dec. 31, 1940. E. N. JACOBI Re. 21,679

FLYWHEEL MAGNETO ASSEMBLY FOR INTERNAL COMBUSTION ENGINES

Original Filed Sept. 16, 1936 2 Sheets-Sheet 2

Inventor
Edward N. Jacobi
By Dean Milton Jones
Attorney

Reissued Dec. 31, 1940

Re. 21,679

UNITED STATES PATENT OFFICE 21,679

FLYWHEEL MAGNETO ASSEMBLY FOR INTERNAL COMBUSTION ENGINES

Edward N. Jacobi, Milwaukee, Wis., assignor to Briggs & Stratton Corporation, Milwaukee, Wis., a corporation of Delaware Original No. 2,157,666, dated May 9, 1939, Serial No. 101,125, September 16, 1936. Application for reissue June 27, 1940, Serial No. 342,706

9 Claims. (Cl. 123—149)

This invention relates to improvements in internal combustion engines and refers particularly to the magneto assemblies therefor.

It is an object of this invention to provide an improved magneto of the flywheel type whereby the size of the flywheel carried ring magnet may be proportioned to the magnetic requirements without regard for other factors.

It is another object of this invention to provide a magneto assembly of the flywheel type in which the coil and its armature core are mounted wholly outside the flywheel.

Another object of this invention is to provide a magneto assembly of the character described in which the coil and its core are so located as to be cooled by the air flow induced by the flywheel impeller so that efficient heat dissipation is obtained with a minimum use of copper and iron.

In this respect it is a further object of this invention to provide a magneto assembly of the character described in which the coil is in the path of air flowing from the flywheel impeller and is located so as to direct the cooling air to predetermined engine parts.

It is also an object of this invention to provide a magneto assembly which so disposes its ignition coil that the lead to the spark plug is exceptionally short.

Another object of this invention is to provide a magneto assembly wherein a quick reversal is obtained in the direction of flux flowing through the armature core upon which the coil is mounted.

More specifically, it is an object of this invention to provide a magneto assembly wherein a three legged armature core is employed whose dimensions are such with respect to the poles of the ring magnet as to insure a very rapid change in the direction of flux flowing in the center leg upon which the coil is mounted.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate a complete example of the physical embodiment of the invention constructed according to the best mode so far devised for the practical application of the principles thereof, and in which.

Figure 1:
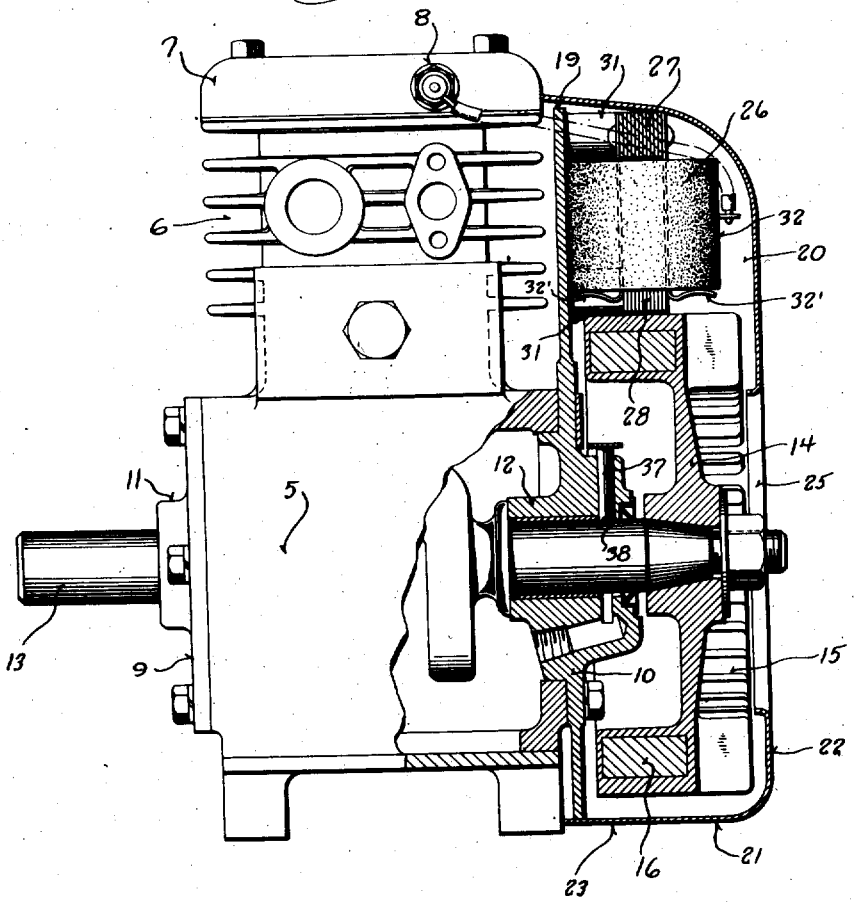
Figure 1 is a side view of an internal combustion engine with parts broken away and in section showing this invention.
Figure 2:
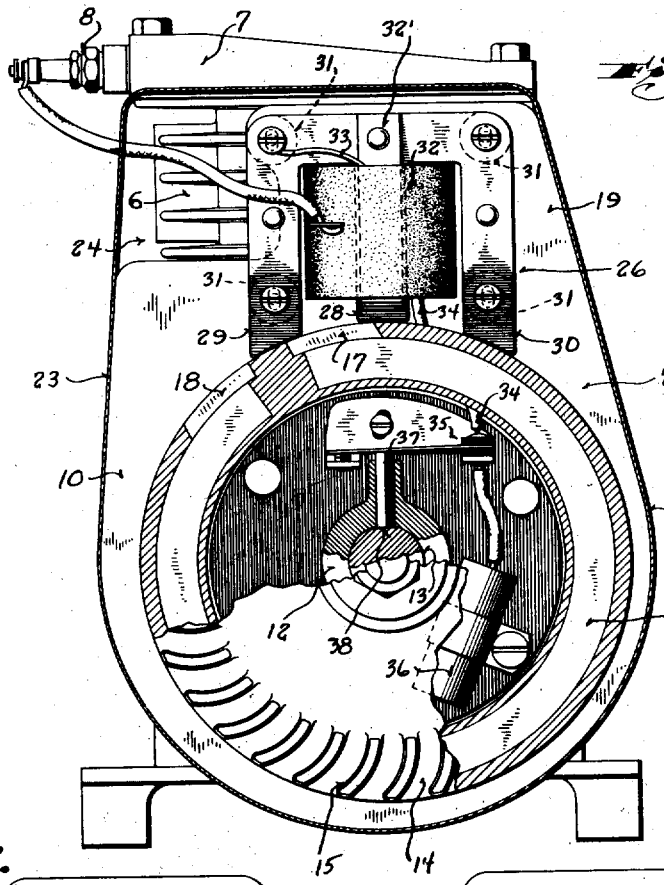
Figure 2 is an end view of the engine with parts broken away and in section.

Referring now particularly to the accompanying drawings, in which like numerals indicate like parts throughout the several views, the numeral 5 designates the crank case of a small portable combustion engine upon which a cylinder 6 is mounted. Ordinarily, the cylinder and the crank case are cast in one unit. The top of the cylinder is closed by a cylinder head 7 in which a spark plug 8 is secured. One end of the crank case is closed by a plate 9 and its opposite end is closed by a mounting plate 10. The plates 9 and 10 have crank shaft bearings 11 and 12, respectively, in which the crank shaft 13 of the engine is journalled.

Outwardly of the mounting plate 10 the crank shaft mounts a flywheel 14, on the outer face of which is an air impeller 15 to induce a flow of cooling air as hereinafter more fully described. Imbedded in the flywheel is a permanent ring magnet 16 having pole pieces 17 and 18 spaced apart a short distance and exposed at the outer periphery of the wheel.

The lower portion of the mounting plate is circular and substantially co-extensive in size with the flywheel. Its upper portion is extended tangentially to provide an extension 19 alongside the cylinder 6 and reaching up to the head 7.

The mounting plate with its upward extension 19 forms the inner wall of a blower housing and air guide 20, the other walls of which are formed by a stamped metal hood 21 which has a flat outer wall 22 of a size and shape roughly co-extensive with that of the mounting plate, and integral side walls 23 which extend inwardly to engage the peripheral edge of the mounting plate at all portions except one upper corner. This corner of the plate is cut away as at 24 to define an outlet for the cooling air induced to flow through the housing by the impeller 15. The opening 24 is so located that the air issuing therefrom impinges the cylinder 6.

An inlet opening 25 to the blower housing and air guide 20 is formed in the outer wall 22 opposite the center of the air impeller 15. Consequently, air is drawn in through the opening 25 and blown out through the opening 24.

In the space within the housing 20 above the flywheel and alongside the outlet opening 24 so as to be located in the direct path of the cooling air is a magneto assembly indicated generally by the numeral 26. The assembly 26 comprises a three legged armature core 27 having a center leg 28 and side legs 29 and 30. The core, as is customary, is preferably laminated and is mounted by posts 31 on the outer face of the mounting plate extension 19 in a position with the lower curved end faces of its three legs 28, 29 and 30 lying in an arc concentric to and slightly spaced from the outer periphery of the flywheel. Consequently, the pole pieces 17 and 18 successively sweep past the legs 28, 29 and 30 to induce a magnetic flux which is abruptly and rapidly reversed in direction through the center leg 28.

Mounted on the center leg is a conventional induction coil 32 having a primary and secondary. The coil is slipped onto the center leg 28 where it is held by a spring retaining member 32'. Inasmuch as the three legs of the core are parallel and lie sufficiently close together so as to obviate the necessity for inwardly projecting horns on the outer legs 29 and 30, assembly of the coil core onto the core is a simple matter as it slides freely onto and off of the center leg.

To obtain correct air gaps between the magnet poles 18 and 17 and the coil core poles 28, 29 and 30, it is only necessary to slide the coil core downward against feeler gauges held between the coil core poles and the flywheel periphery, and with the coil core held in this manner tighten its fastening screws.

One end of the primary and secondary of the coil is grounded as at 33. The other end of the secondary is connected through the customary high tension lead with the spark plug; and the other end of the primary is connected through a conductor 34 with an insulated terminal 35 of a circuit breaker. The other terminal of the circuit breaker is grounded and is also connected to a condenser 36 in the customary manner. The circuit breaker is adapted to be actuated by a pusher pin 37, which rides on the crank shaft in line with a flattened portion 38 so that the pin is permitted to descend and allow closure of the circuit breaker once each revolution.

It is to be observed that all of the instrumentalities of the magneto are mounted on the outer face of the mounting plate where they are readily accessible, especially the coil and its armature core. It is also to be noted that this disposition of the coil and its core locates the same at a substantial elevation above the base where it is more likely to be clean and free from oil, and being mounted outside the flywheel and in position to be impinged by the cooling air, adequate heat dissipation is obtained with a minimum use of copper and iron.

In this respect it is to be observed that the coil and its core are so mounted on the plate 19 as to lie alongside or adjacent to the side of the main air stream issuing from the blower and passing to the outlet opening 24. One side of the coil core thus forms a guide or wall extending along one side of the main air stream so as to be cooled directly thereby. It is also to be observed that the curved bottom wall and tangential side wall of the blower housing, together with the coil defines substantially a scroll casing for the centrifugal blower impeller, and while the main air stream flows through this casing between the coil core and adjacent side wall of the housing to issue from the opening 24 and directly impinge the valves which are at the hottest portion of the engine, other lesser air streams flow through and over the coil and also past the other side of the coil core to impinge the cylinder head.

Moreover, being mounted near the top of the mounting plate near the cylinder head, the high tension lead to the spark plug may be exceptionally short.

Another advantage of the present construction resides in the fact that the mounting plate besides carrying the magneto assembly also forms one wall of the blower housing air guide, thus reducing the number of parts; and with the coil and its core mounted outside the flywheel, the size of the ring magnet can be proportioned to the magnetic requirements without regard for the necessity of enclosing a bulky coil. This permits making the flywheel smaller in diameter and in turn allows the engine to be built much lower than in past constructions, as the flywheel when proportioned to the requirements of the length of the magnet bar needed for permanence is much smaller and much more economical of the material both in the magnet and in the flywheel proper than in a construction where the size of the flywheel is determined by mechanism which it must enclose.

Also, of particular importance is the fact that a three legged armature core is employed, for through its use a more efficient magnetic machine is obtained.

Figure 3:
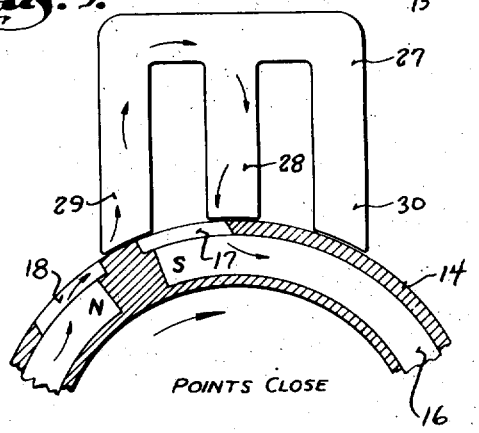
Figures 3 and 4 are detail views showing the manner in which the direction of flux is abruptly changed.
Figure 4:
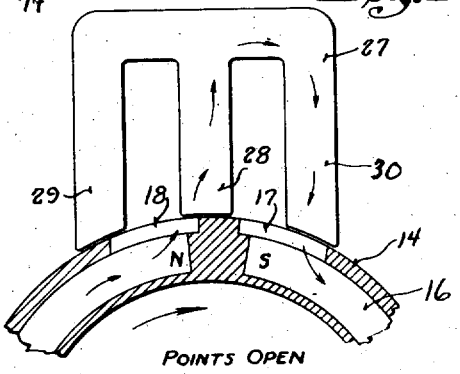

As will be readily apparent particularly from Figures 3 and 4, the flux through the center leg 28 reverses abruptly and rapidly as the pole pieces 17 and 18 sweep past the pole faces of the three legs. Being close together and mounted exteriorly of the flywheel adjacent to its periphery, the three legs of the armature core are swept by the magnet poles in a small annular movement to thus further assure rapidity in the change in direction of the magnetic flux through the center leg 28 and consequently the coil.

In this respect, attention is directed to the fact that the arcuate length of the two magnet pole pieces 17 and 18 is sufficient to span the distance between adjacent legs of the armature core and that the space between the pole pieces 17 and 18 is less than or at least not greater than the arcuate length of the pole face of the center leg 28. This dimensional relationship is responsible for the exceptional rapidity of the change in direction of flux for as will be readily apparent from Figures 3 and 4, the flux flowing in one direction (Figure 3) hangs on and continues to flow in this direction until the very instant that the flux begins to flow in the opposite direction (Figure 4).

From the foregoing description taken in connection with the accompanying drawings, it will be readily apparent to those skilled in the art, that this invention provides an exceptionally compact and magnetically efficient magneto assembly for small portable internal combustion engines.

What I claim as my invention is:

1. In a magneto assembly for an internal combustion engine having a crankcase, a crankshaft and a cylinder mounted on the crankcase: a plate closing one side of the crankcase and having a part projecting alongside the cylinder; a bearing on the plate for the crankshaft; magneto parts carried by the plate adjacent to the bearing; a hollow flywheel mounted on the crankshaft and cooperating with the plate to enclose the magneto parts; a permanent magnet carried by the flywheel and having poles facing the exterior of the flywheel rim; and an armature coil core mounted on the side of the plate opposite the cylinder so that the plate constitutes a heat barrier between the cylinder and the armature coil core, said core having limbs providing poles in close juxtaposition to the path of the magnet poles to be swept thereby as the flywheel revolves.

2. A magneto assembly for an internal combustion engine having a crankcase with a crankshaft therein and a cylinder mounted on the crankcase: a flywheel on the crankshaft having its side which faces the crankcase hollowed to provide a cavity; a permanent magnet carried by the flywheel with its poles facing the exterior of the flywheel rim; magneto parts inside the flywheel cavity including a circuit breaker for the magneto primary circuit; a cam rotatable with the crankshaft; a pusher pin operable by the cam to actuate the circuit breaker; an armature coil core having spaced limbs providing poles adapted to be swept by the poles of the permanent magnet; a plate closing the crankcase and the cavity formed by the hollow of the flywheel and having bores providing bearings for the crankshaft and the pusher pin and extending beyond the rim of the flywheel alongside the cylinder to provide a heat barrier between the cylinder and the armature coil core; and means for mounting the core on said extending portion of the plate.

3. In an internal combustion engine of the small portable type having a crankcase with a cylinder mounted thereon, a crankshaft and a flywheel fixed to the crankshaft: an air impeller rotating with the flywheel; a blower housing and air guide to direct the flow of air induced by the impeller over the cylinder comprising, spaced walls between which the flywheel and air impeller are mounted, said spaced walls having a substantially circular lower portion with an upward extension disposed alongside the cylinder with the inside wall shaped to provide an outlet through which the air issues for passage over the cylinder, said walls being joined at their peripheral edges; a magneto for the engine comprising, a permanent magnet carried by the flywheel with its poles facing the outer periphery of the wheel; an armature core having its poles lying in an arc concentric to the outer periphery of the wheel so as to be swept by the poles of the flywheel carried magnet; an induction coil on the armature core; and means mounting the armature core on the extension of one of said spaced walls of the blower housing and air guide so that said armature core and its coil lie in the path of the cooling air-flow induced by the impeller.

4. In an internal combustion engine of the small portable type having a crankcase with a cylinder mounted thereon, a crankshaft and a flywheel fixed to the crankshaft: an air impeller rotating with the flywheel; a blower housing and air guide to direct the flow of air induced by the impeller over the cylinder; a magneto for the engine including an armature core and a coil on the armature core; and means mounting the armature core from one of the inside walls of the blower housing and air guide in such a position as to be in the path of the cooling air flowing through the housing.

5. In an internal combustion engine of the small portable type having a crankcase with a cylinder mounted thereon and having a crankshaft with a flywheel fixed thereto: an air impeller rotating with the flywheel; a blower housing and air guide enclosing the flywheel and the air impeller and having an extension disposed alongside the cylinder, said housing having spaced inner and outer walls between which the flywheel and air impeller are disposed; means for securing the inner wall to the crankcase of the engine between the cylinder and flywheel rim, said inner wall of the housing having an opening outwardly of the flywheel rim to provide an outlet through which air may flow to impinge the cylinder, the outer wall having an entrance opening opposite the center of the air impeller; a magneto assembly for the engine including an armature core and an induction coil mounted thereon; and means mounting said armature core in the space defined by the extension of the blower housing and air guide adjacent to the flywheel rim and said opening so that the armature core is located in the path of the air-flow induced by the impeller.

6. In an internal combustion engine of the small portable type having a crankcase with a cylinder mounted thereon: a plate closing one end of the crankcase and having a crankshaft bearing in which the crankshaft of the engine is journalled; a flywheel mounted on the crankshaft and overlying the outer face of the plate; said plate having its part which closes the end of the crankcase substantially coextensive with the flywheel and having an extension projecting a substantial distance from said part alongside the cylinder; and a magneto assembly mounted entirely on the outer face of the extension of said plate so as to be readily accessible and comprising an armature core and an induction coil carried by the core.

7. In an internal combustion engine having a crankcase and a cylinder closed by a cylinder head and having a crankshaft with a flywheel fixed thereto: an air impeller rotating with the fly-wheel; a blower housing and air guide enclosing the flywheel and air impeller and extending along the cylinder head; an ignition coil and core mounted in the blower housing between the flywheel and the cylinder head end of the blower housing; and said housing having a discharge port alongside the coil core whereby the coil core serves to guide the air issuing from the impeller to the discharge port.

8. In an internal combustion engine having a crankcase with a cylinder mounted thereon and having a crankshaft with a flywheel fixed thereto: an air impeller rotating with the flywheel and adapted to project a current of air tangentially from the periphery of the impeller toward the cylinder; a blower housing and air guide enclosing the flywheel and air impeller and extending along the cylinder and having a discharge port so located as to discharge air onto the hottest portions of the cylinder; an ignition coil mounted in the blower housing between the flywheel and the remote end of the blower housing and to one side of the tangential air stream flowing from the impeller to the said discharge port.

9. In an internal combustion engine of the small portable type having a crankcase and a cylinder mounted thereon: a plate closing one end of the crankcase and having a portion extended to lie alongside the cylinder; a bearing carried by said plate in which the crankshaft of the engine is journalled; a flywheel mounted on the crankshaft overlying said plate; a permanent magnet carried by the flywheel with its poles facing the outer periphery of the wheel; an armature core mounted on said extended portion of the plate with its pole faces concentric to the flywheel and spaced slightly from the outer periphery thereof so as to be swept by the poles of the flywheel carried magnet; an induction coil carried by the armature core; an air impeller rotating with the flywheel; and a hood surrounding the flywheel and the plate, said hood extending over the front and top of the induction coil and armature core in close proximity thereto to a point directly adjacent to the side of the cylinder head, whereby the hood, the coil and the plate define a passage for directing the air flow induced by the impeller against the cylinder walls of the engine.

EDWARD N. JACOBI.